United States Patent [19]

Mitsuyama

[11] Patent Number: 4,764,159
[45] Date of Patent: Aug. 16, 1988

[54] DOCUMENT FILE

[76] Inventor: Masuhiro Mitsuyama, 1071, Kinugasa, Wake-cho, Wake-gun, Okayama, Japan

[21] Appl. No.: 37,101

[22] Filed: Apr. 9, 1987

Related U.S. Application Data

[63] Continuation of Ser. No. 873,773, Jun. 11, 1986, abandoned.

[51] Int. Cl.⁴ .................. B31B 41/64; B31B 11/64
[52] U.S. Cl. ........................... 493/189; 493/90; 493/206; 493/210; 493/918; 493/920; 493/947; 156/581; 150/52 B; 190/902; 229/72; 383/38; 383/86
[58] Field of Search ............ 493/84, 90, 189, 206, 493/207, 209, 210, 374, 393, 917, 918, 920, 947; 156/581; 150/52 B, 52 R, 147; 190/902; 229/72; 383/31, 38, 86

[56] References Cited

U.S. PATENT DOCUMENTS

| | | | |
|---|---|---|---|
| 404,758 | 6/1889 | Weissbrod | 383/86 |
| 508,394 | 11/1893 | Andrews | 229/72 |
| 923,539 | 6/1909 | Law | 229/72 |
| 3,113,899 | 12/1963 | Hoag et al. | 156/581 |
| 3,324,918 | 6/1967 | Miller | 150/52 R |
| 4,079,570 | 3/1978 | Rucker | 156/581 |
| 4,498,591 | 2/1985 | Smith | 493/918 |

FOREIGN PATENT DOCUMENTS

| | | | |
|---|---|---|---|
| 1211588 | 3/1966 | Fed. Rep. of Germany | 383/38 |
| 1466740 | 1/1967 | France | 383/31 |

Primary Examiner—Frederick R. Schmidt
Assistant Examiner—William E. Terrell
Attorney, Agent, or Firm—Wenderoth, Lind & Ponack

[57] ABSTRACT

The present invention is drawn to an improved method of making a document file which has a pair of covers and a plurality of file elements laminated one upon another between the covers. The file elements are hot-sealed together and to the covers. The covers each have an auxiliary sheet hot-sealed to the cover body. The outermost file elements are hot-sealed to the auxiliary sheets of the covers. Thus, no dents or recesses are formed on the cover by hot-sealing the outermost file elements to the respective covers.

1 Claim, 3 Drawing Sheets

DOCUMENT FILE

This is a continuation of application Ser. No. 873,773, filed June 11, 1986 and now abandoned.

BACKGROUND OF THE INVENTION

1. Field of the Invention

The present invention relates to a method of making a document file having a pair of covers and a plurality of file elements that are laminated one upon another, between the covers, and are heat-sealed together.

2. Description of Related Art

In the prior art method, the outermost file elements are bonded directly to the inner side of the covers. Accordingly, dents or recesses are formed on the outer side of the covers due to a sealing or bonding process performed with heat. This greatly decreases the value of the finished product.

SUMMARY OF THE INVENTION

An object of the present invention is to provide a method of making a document file which obviates the above mentioned shortcomings.

In accordance with the present invention, each of the covers has an auxiliary sheet to which the outermost file element is heat-sealed. Thus, no dent or recess is formed on the front side of the cover by hot sealing.

Other objects and features of the present invention will become apparent from the following description taken with the accompanying drawings, in which:

DETAILED DESCRIPTION OF THE PREFERRED EMBODIMENT

Figure 2:
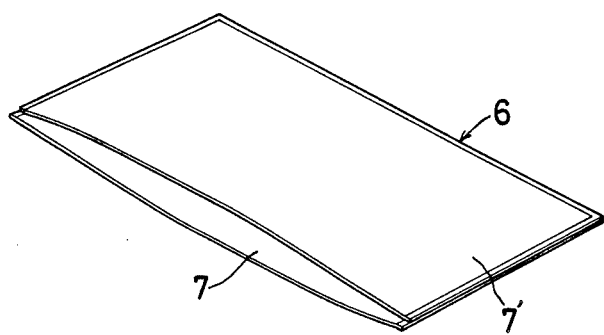
FIG. 2 is a perspective view of the file element.
Figure 5:
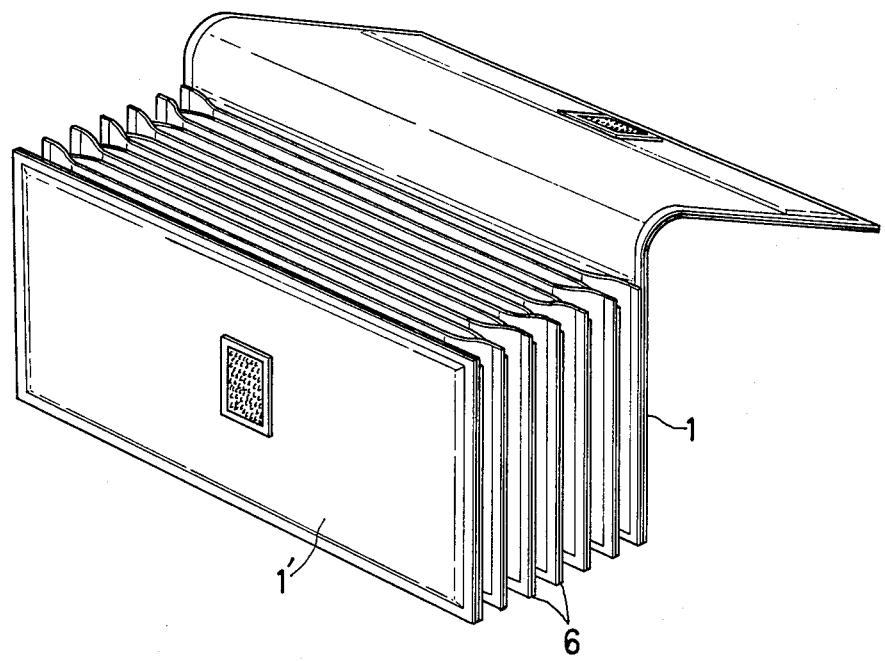
FIG. 5 is a perspective view of the document file manufactured in accordance with the present invention.

Referring to the drawings, the document file (FIG. 5) manufactured in accordance with the present invention comprises a pair of covers 1, 1' each having a pad 2 enclosed by a cover sheet 3 of a material such as polyvinyl chloride, which is heat-sealed using high frequency at its edge 4 to enclose the pad, and an auxiliary sheet 5 of vinyl chloride which is heat sealed using high frequency to the cover sheet 3 along all sides thereof except one. Between the pair of covers 1, 1' there are a plurality of file elements 6 disposed one upon another and sealed together and to the covers. Each file element in (FIG. 2) has a body 7 and a flap 7' sealed to the body along all sides thereof except one.

Figure 4:
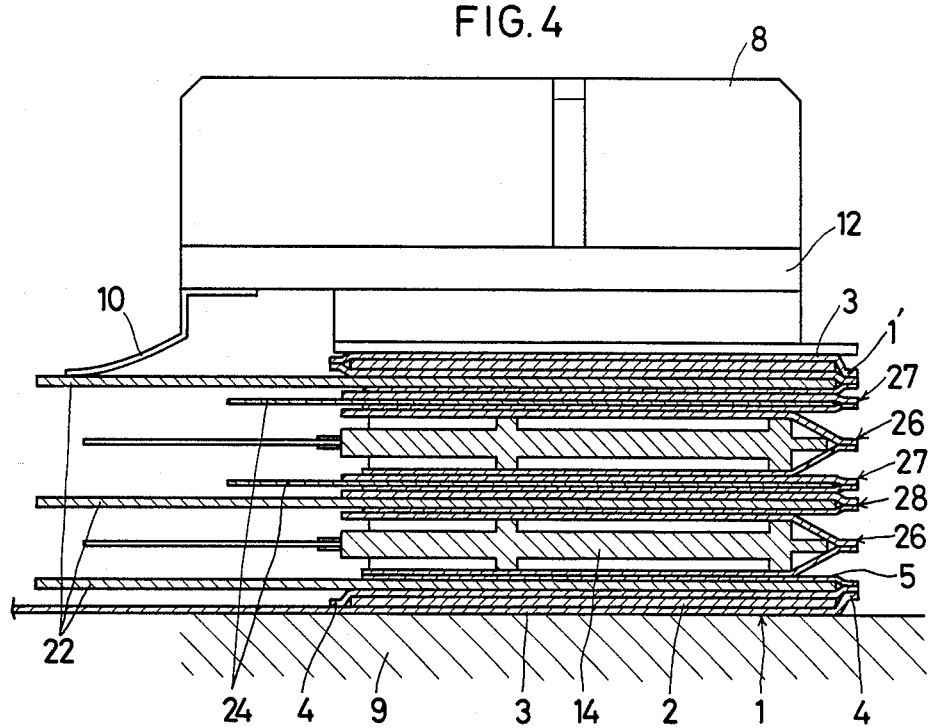
FIG. 4 is a sectional view showing how the document file according to the present invention is produced.

Referring to FIG. 4, a mold 22, without a raised portion, in the form of a flat plate is inserted into a pocket formed between the cover 1 and the auxiliary sheet 5. A file element 6 is placed on the cover 1 with the auxiliary sheet 5. A mold 14 is inserted into the file element 6. This unit is indicated by numeral 26.

Figure 3:
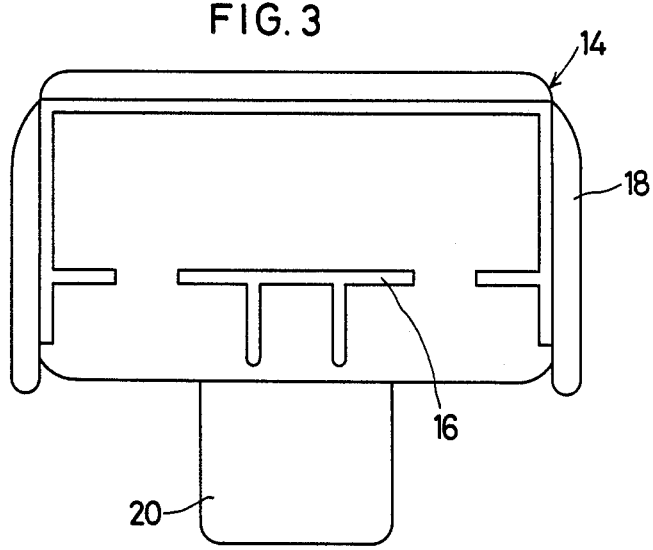
FIG. 3 is a plan view of the mold having raised portions.

The mold 14 (FIG. 3) has sealing raised portions 16 on both sides, a positioning edge 18 at each end for positioning the mold 14 in the file element, and a conductive portion 20.

A unit 28 is placed on the unit 26 the unit having another file element 6 into which the mold 22 in the form of a flat plate is inserted.

A unit 27 is placed on the unit 28, the unit having another file element 6 and an electric insulator 24 inserted therein.

Another unit 26 is placed on the unit 27. Another unit 27 is placed on the unit 26. Also, the other cover 1' is placed on the unit 27.

The units stacked one upon another as described above are placed on a base plate 9 and are pressed by a presser plate or a conducting plate 8 which has at one thereof a contact plate 10 made of a flexible conductive material, and a heat insulator 12.

Figure 1:
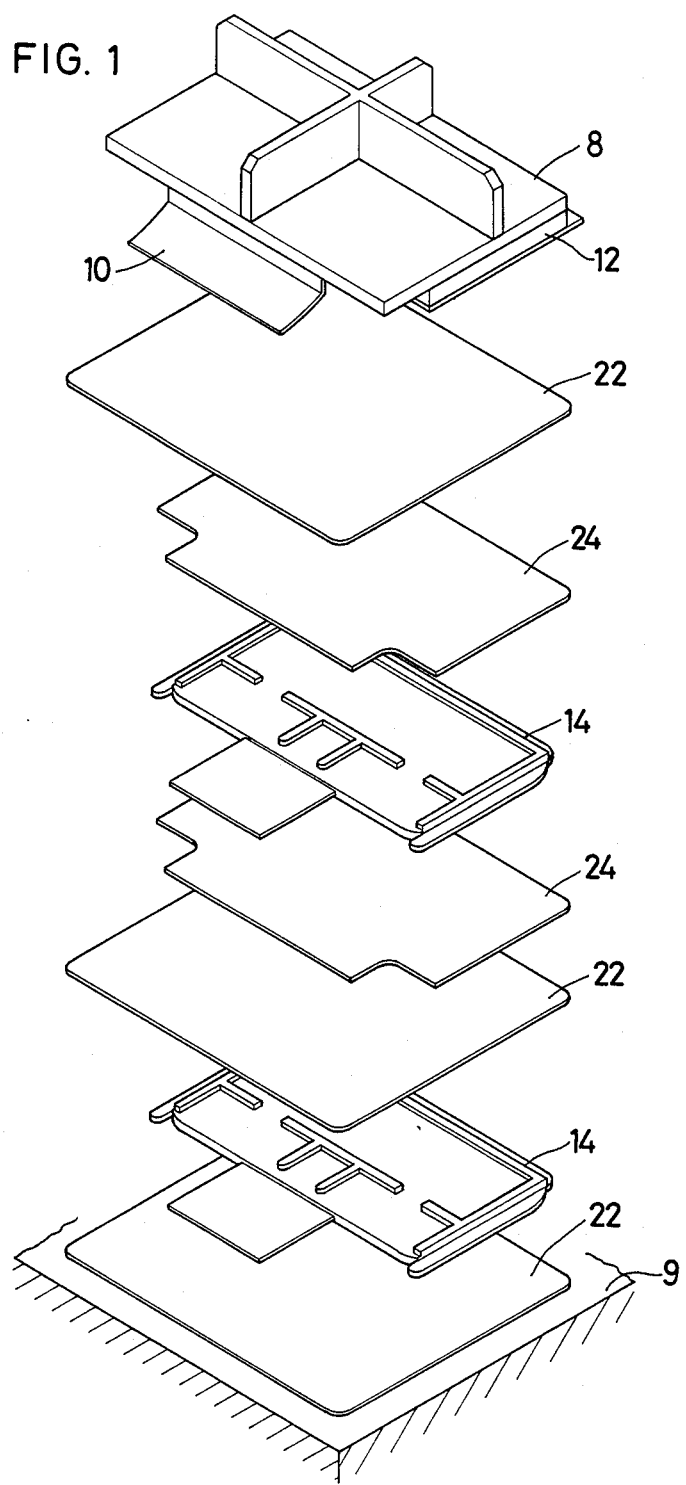
FIG. 1 is a perspective view showing molds and electric insulators arranged for hot-sealing the covers with file elements omitted for simplicity.

FIG. 1 shows the order in which the molds 22, electric insulators 24, and molds 14 are arranged with the covers 1, 1' and the file elements 6 omitted for simplicity.

According to the present invention, the covers 1, 1' with the molds 22, and the units 26, 27 and 28, that is, the file elements 6 having the mold 14, electric insulator 24, or mold 22 inserted therein are stacked one upon another as shown in FIG. 4. The stack consisting of the covers and the units are pressed by the presser or conducting plate 8 against the base plate 9 with the contact plate 10 of the conducting plate 8 in contact with the nearest mold (22 in FIG. 4). Then, voltage is applied between the conducting plate 8 and the base plate 9. Heat is transmitted between the molds 22 and the molds 14 through the electric insulators 24 which transmit heat to some extent.

The flap 7' of each file element 6 is hot-sealed to the base 7 of the adjacent file element 6 only at the raised portions 16 on the mold 14. The flap 7 of the file element 6 next to the cover 1 or 1' is heat-sealed to the auxiliary sheet 5 of the cover 1 or 1' only at the raised portions 16 on the mold 14.

Thus, no sealing mark is formed on the cover 1 or 1' itself. Since the raised portions 16 are disposed somewhat inside of the side edge of the mold 14, any pairs of the adjoining file elements 6 are heat-sealed together slightly inside of both side edges and of the bottom edge. Thus, what is called the "gore" is formed.

Although in the preferred embodiment the electrical insulators 24 are interposed between the molds 14 and the molds 22, they may be omitted. Such an embodiment in which the insulators 24 are not used is not shown in the drawings.

In the preferred embodiment, the conductive plate 8 is usually uses as one electrode whereas the base plate 9 is used as another electrode. Another arrangement is possible in which the mold 14 in the middle is used as one electrode with the conducting plate 8 and the base plate 9 used as other electrodes.

Heat-sealing by high frequency is possible only if there is a raised portion on at least one of the opposing surfaces of the mold 22 and the mold 14. If this condition is met, the mold 14 having raised portions on its both sides may be replaced with a mold having raised portions on only one side.

Although in the preferred embodiment a plurality of separate file elements 6 are heat-sealed to one another to make a document file, several file elements may be firstly heat-sealed together to make a sub-unit and a plurality of such sub-units may then be heat-sealed to one another to make a document file.

What I claim is:

1. A method of manufacturing a document file having a pair of covers and a plurality of bag-like file elements extending between said pair of covers, said method comprising:

providing each of said covers with a respective auxiliary sheet attached thereto;

stacking one of said pair of covers, a plurality of said bag-like file elements, and the other of said covers one upon another with each of said respective auxiliary sheets disposed adjacent an outermost one of said bag-like file elements;

inserting a mold into respective ones of said file elements and between each of said covers and the auxiliary sheet attached thereto to form a stacked assembly in which each adjacent pair of molds has a pair of opposed surfaces, several of the molds having a said surface thereof comprising a raised portion, and prearranging the molds inserted in the stacked file elements and disposed between said covers and the auxiliary sheets attached thereto such that for every pair of said opposed surfaces one of said pair of opposed surfaces is a said surface comprising a raised portion;

positioning an electric insulator between at least one said adjacent pair of molds;

placing the stacked assembly comprising the one of said covers and the auxiliary sheet attached thereto, the plurality of file elements, the molds inserted and prearranged in the file elements, the other of said covers and the auxiliary sheet attached thereto, and the molds disposed between each of said covers and the auxiliary sheets attached thereto, and the electric insulator positioned between at least one said adjacent pair of molds between a conducting plate and a base plate means and pressing the assembly together; and applying voltage between the conducting plate and the base plate means for hot sealing said auxiliary sheet attached to said one of the covers, said plurality of file elements, and said auxiliary sheet attached to said other of the covers together along only the raised portions of said several molds.

* * * * *